United States Patent Office 3,143,830
Patented Aug. 11, 1964

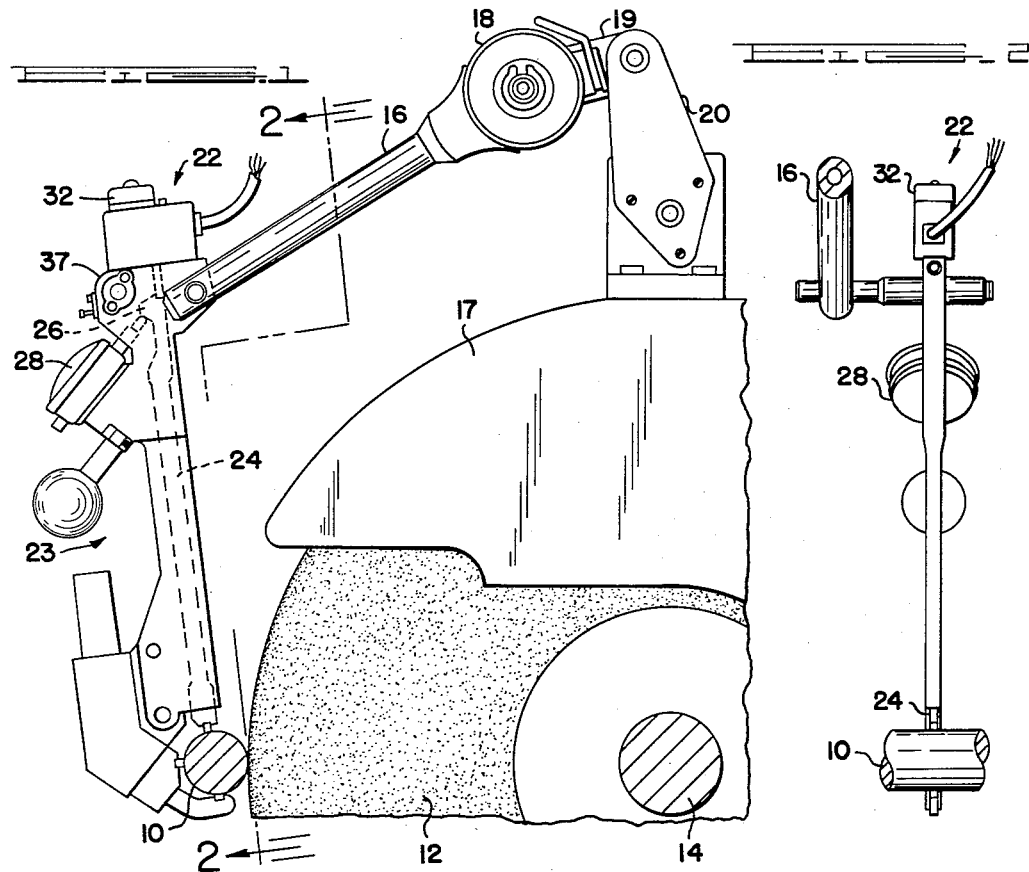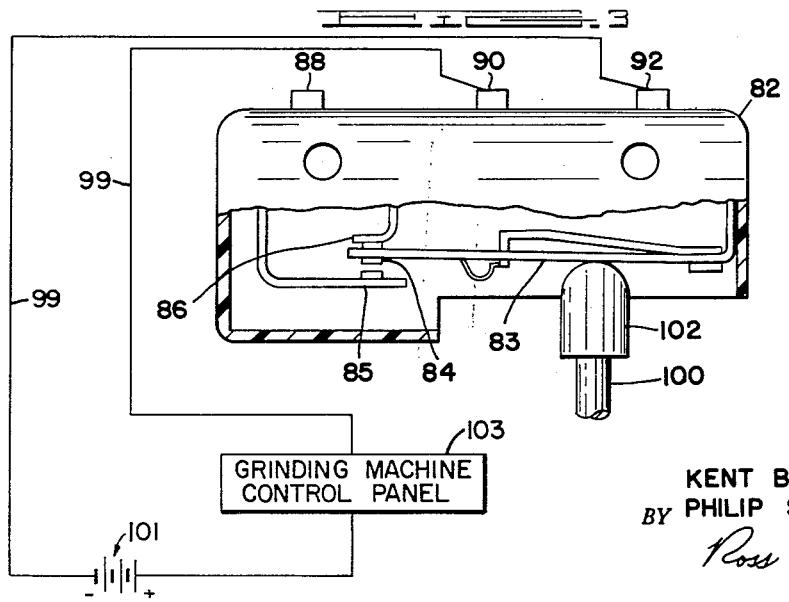

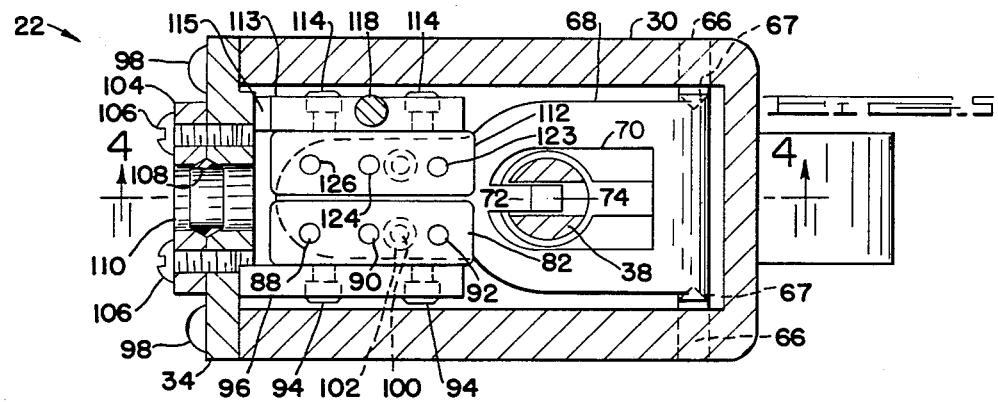
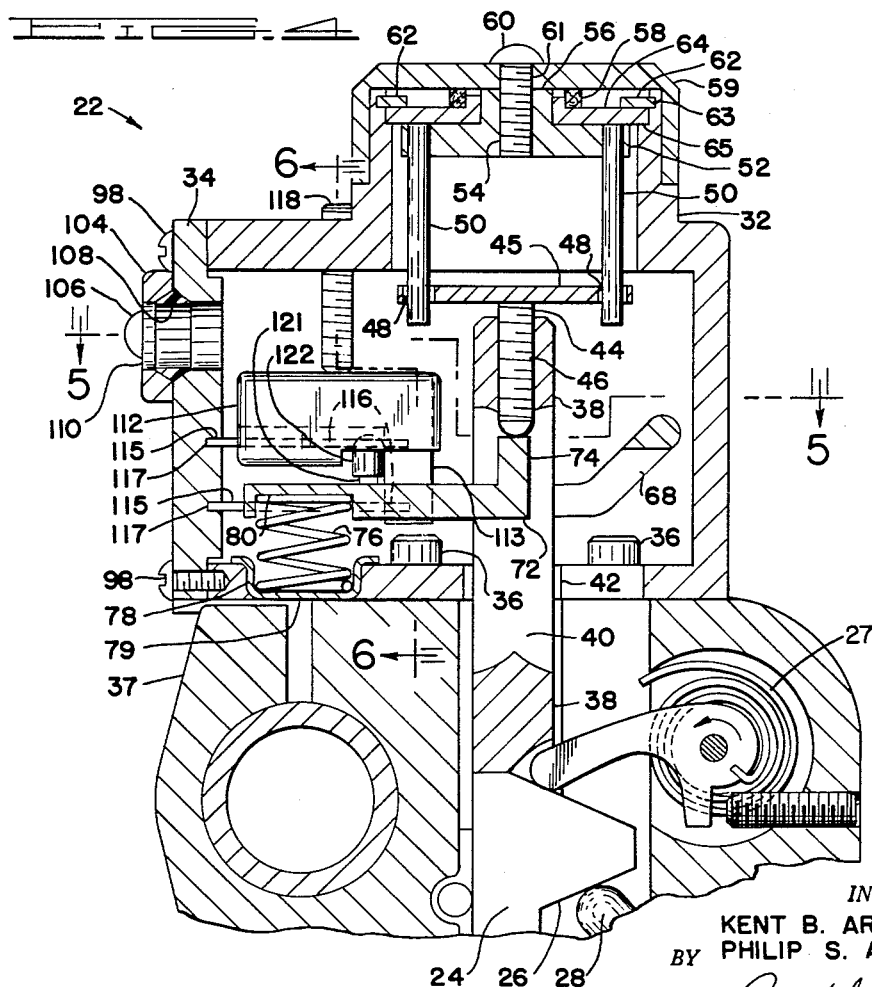

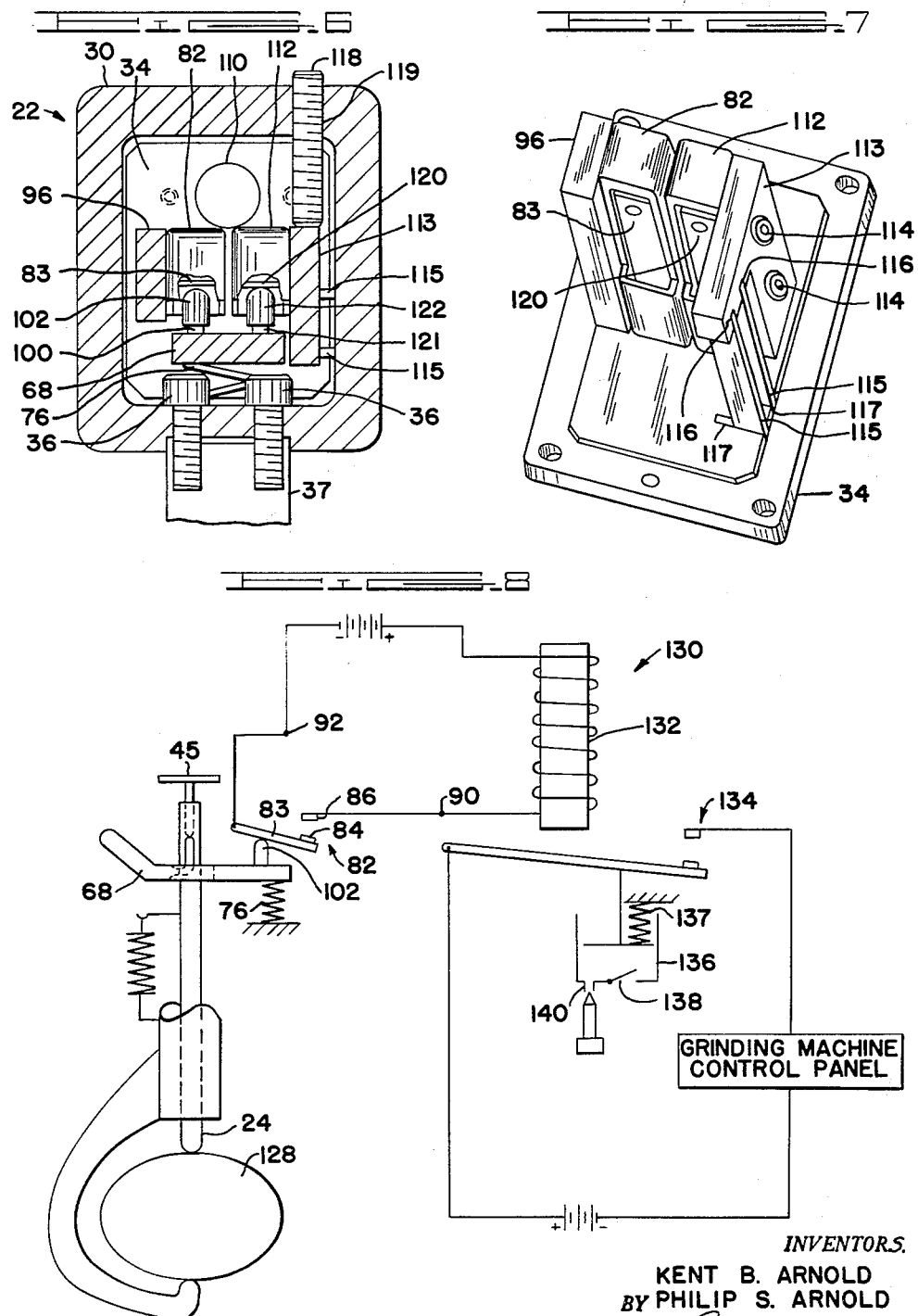

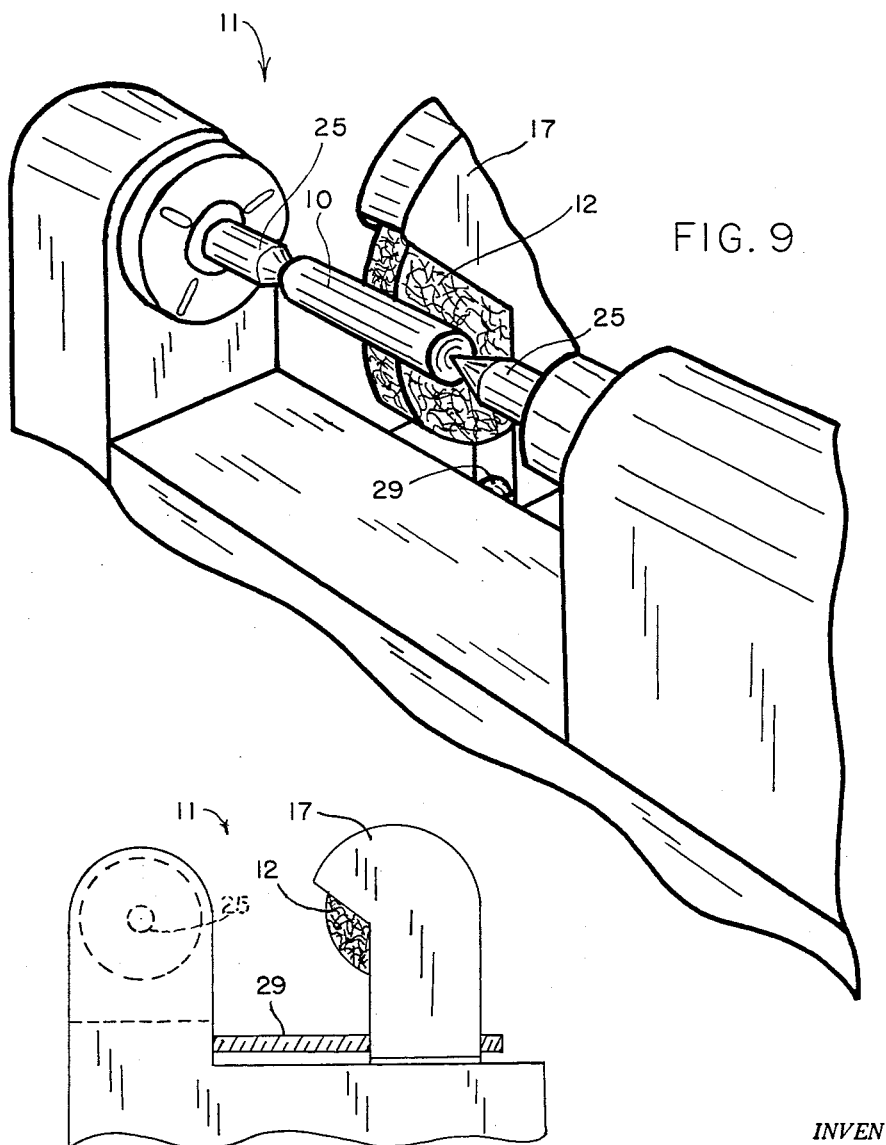

3,143,830
GAUGING APPARATUS FOR CONTROLLING
A GRINDING MACHINE
Kent B. Arnold and Philip S. Arnold, 3321 E. Court St.,
Flint 1, Mich.
Filed Apr. 3, 1961, Ser. No. 111,119
10 Claims. (Cl. 51—165)

This invention relates to gauging apparatus and more particularly to gauging apparatus which controls a grinding machine.

The present invention is a grinding machine appliance wherein a gauge of the type which has a plunger in contact with a workpiece controls a switch which in turn controls the grinding machine to achieve a preselected final diameter of the workpiece. Motion of the gauge plunger in response to decrease in diameter of the workpiece is transmitted to a pivoted lever which is in direct contact with the spring leaf of a snap-action electrical switch and causes rapid and positive separation of the switch contacts whereby the flow of conventional electrical power to the grinding machine is interrupted. A second electrical switch is provided and similarly actuated to slow the rate of grinding feed when the workpiece approaches but has not yet reached the preselected final diameter. In one modification of the invention, for use in controlling the grinding of the major cross-sectional axis of an elliptical workpiece to a preselected final size, a time delay relay cooperates with the other elements of the invention to permit electrical power to by-pass the electrical switch and to continue to flow to the grinding machine when the gauge plunger senses axes of lesser size than that preselected for the final size of the major cross-sectional axis.

It has been found that electrical arcing occurs between the contact points of electrical switch mechanisms heretofore used in the art, when electrical current is passed directly through the switch. This electrical arcing causes a series of discrete electrical impulses or charges to pass rapidly between the contact points of a conventional switch when the contact points slowly separate from each other as the workpiece approaches tolerance, thus creating and sending to the grinding machine a series of false signals during the critical period of time immediately prior to positive separation of the contact points. Further, such arcing causes pitting of the contact points themselves and thereby increases the tendency of the electrical current to arc between the contact points. The false signals thus sent to the grinding machine as a result of electrical arcing between the contact points of previous electrical switch mechanisms introduce errors in the accuracy of the grinding process far in excess of the sensing capabilities of the continuous grinding gauge and of the tolerances required in modern precision grinding operations. The use of electrical relay switches and a power amplification system to permit a low voltage in the primary electrical switch so as to reduce arcing has been found expensive and vulnerable to breakdown and failure.

It is accordingly an object of the invention to provide an improved gauging apparatus for controlling the grinding of a workpiece to a preselected size.

Another object of the invention is to provide an improved gauging apparatus for controlling the grinding of the major cross-sectional axis of an elliptical workpiece to a preselected size.

Another object is to provide in a gauging apparatus for a grinding machine an improved gauge-operated machine control switch.

Another object is to provide in a gauging apparatus for a grinding machine improved grinding machine electrical control means responsive to gauge sensing of a preselected diameter of the workpiece.

A further object is to provide in a gauge-operated grinding machine control switch improved means for actuating an electrical circuit in response to sensing by a mechanical gauge of a preselected diameter of the workpiece.

A further object is to provide in a gauging apparatus for a grinding machine improved means for creating and transmitting to a grinding machine a plurality of discrete electrical control signals each responsive to a gauge sensing of a respectively preselected external diameter of the workpiece.

Still a further object is to provide in a grinding machine gauging and control apparatus improved mechanical means for directly transmitting to the spring leaf of a snap-action electrical switch mechanical motion of a continuous grinding gauge to actuate said switch when the workpiece has been reduced to a preselected diameter.

These, together with various auxiliary features and objects of the invention which will later become apparent as the following description proceeds, are attained by the present invention, a preferred embodiment of which has been illustrated, by way of example only, in the accompanying drawings, forming a part of this specification, in which like characters are employed to designate like parts throughout the same, and wherein:

FIGURE 1 is a side elevation of a continuous grinding gauge, a gauge-operated machine control switch, gauge mounting means, a partial side elevation of a grinding wheel, and a cross-sectional view of a cylindrical workpiece.

FIGURE 2 is a view of a continuous grinding gauge, a gauge-operated machine control switch, and partial views of a gauge support arm and a cylindrical workpiece, taken along line 2—2 of FIGURE 1.

FIGURE 3 is an enlarged side view of a snap-action electrical switch in partial vertical section showing the common contact in contact with the normally open contact and an insulating cap, mounted upon a post on a transfer lever, in direct contact with the spring leaf of the switch.

FIGURE 4 is a vertical section of a gauge-operated machine control switch and a partial vertical section of a continuous grinding gauge.

FIGURE 5 is a sectional view of a gauge-operated machine control switch taken along line 5—5 of FIGURE 4.

FIGURE 6 is a sectional view of a gauge-operated machine control switch taken along line 6—6 of FIGURE 4.

FIGURE 7 is a perspective view of a gauge-operated machine control switch cover plate, a snap-action electrical switch support bracket, a snap-action electrical switch floating support bracket, a pair of snap-action electrical switch floating support bracket springs, and a pair of snap-action electrical switches.

FIGURE 8 is a schematic view of a gauge-operated machine control switch and a time delay relay.

FIGURE 9 is a perspective view of a portion of a grinding machine showing a workpiece mounted in a work support.

FIGURE 10 is a side view of a portion of a grinding machine showing feeding mechanism which causes movement of the grinding wheel with respect to the workpiece.

The present invention is designed particularly for use in grinding a rotating workpiece, such as the cylindrical shaft 10 shown in FIGURES 1, 2, and 9. It includes a conventional grinding machine generally shown at 11 in FIGURE 9 having a grinding wheel 12 mounted on a shaft 14, gauge mounting means including a spring-loaded gauge support arm 16 connected to the housing 17 of the grinding machine by a bearing assembly 18, a link 19, and a bracket 20, and a gauge-operated machine control switch generally indicated by the figure 22 and more particularly hereinafter described. Workpiece 10 is mounted in a conventional manner in a work support 25, 25 for rotation and axial translation in contact with grinding wheel 12. Workpiece 10 and grinding wheel 12 are separable from contact with each other by conventional feeding mechanism 29 which causes movement of the grinding wheel with respect to the workpiece. A conventional continuous grinding gauge generally indicated by the figure 23 is supported by the other end of gauge support arm 16, the calipers thereof being able to removably embrace workpiece 10 so as to be in continuous contact with the workpiece during the grinding operation to provide a continuous sensing of the external diameter of the workpiece while the same is being reduced by abrasion by grinding wheel 12.

The lower end of a conventional gauge plunger 24 within gauge 23 is maintained in contact with workpiece 10 by a plunger spring 27 within grinding gauge 23 and moves axially downward in the direction of the center of the workpiece as the diameter of the workpiece is reduced. The underside of a projection 26 at the upper end of plunger 24 is in contact with and actuates a conventional dial indicator 28 to provide visual means for continuously indicating the instant diameter of workpiece 10 during the grinding operation.

Machine control switch 22 includes a box-like housing 30 having a turret 32 on the top thereof and a removable switch cover plate 34 closing an opening in one end thereof. Housing 30 is mounted by a plurality of cap screws 36 to the top of the frame 37 of gauge 23. A plunger extension 38 having a longitudinal slot 40 therein is attached, as by brazing, to the upper end of plunger 24, extending upward in axial extension of plunger 24 through an aperture 42 in the bottom of housing 30. A transfer lever adjusting screw 44 having an enlarged transverse head 45 thereon is threadably engaged within a threaded longitudinal aperture 46 in the upper end of plunger extension 38 and extends downwardly into slot 40.

A pair of slots 48 in head 45 of screw 44 are respectively engaged by a pair of downwardly-extending fork pins 50 each connected at its upper end within a fork bar 52 having a threaded aperture 54 therein and an internally threaded annular flange 56 thereon. Flange 56 is surrounded by a felt washer 58 and is rigidly retained against the lower surface of a graduated thimble 59, rotatably surrounding turret 32, by a downwardly directed button head screw 60 passing through a central aperture 61 in the thimble and threadably engaged within aperture 54 and flange 56. Rotation of thimble 59 will thus cause fork bar 52, fork pins 50, and screw 44 to rotate, whereby screw 44 is adjusted longitudinally within plunger extension 38. An annular retaining ring 62 engages a recess 63 within turret 32 and retains an annular bearing disc 64, surrounding flange 56, upon a shoulder 65 of turret 32 and against the upper surface of fork bar 52 and thus retains the assembly connected to housing 30.

A pair of spaced, horizontal, axially aligned, inwardly-directed pivot screws 66 are retained by conventional means, such as threads, in the sides of housing 30 and extend into a pair of mating depressions 67, respectively, in the sides of a transfer lever 68 near one end thereof to pivotally support said lever. An aperture 70 is formed in lever 68 and surrounds plunger extension 38. A tongue 72 of lever 68 extends into aperture 70 along the central axis of said transfer lever and terminates in an upwardly-directed transfer lever post 74 within slot 40 and coaxial with plunger extension 38 and screw 44.

The lower end of a compressible spring 76 is retained by an upwardly concave retaining cup 78 fitted into a depression 79 in the base of housing 30, the upper end of spring 76 being retained within an aligned depression 80 in the underside of lever 68 at a point near the end thereof opposite pivot screws 66. The upper pressure of spring 76 retains the upper end of post 74 in contact with the lower end of screw 44, when upward movement of lever 68 is not otherwise limited by contact with the spring leaf of a snap-action switch as hereinafter described, thereby adjustably limiting the upward travel of lever 68. Rotation of graduated thimble 59 causes screw 44 to rotate and hence to move longitudinally within plunger extension 38 and slot 40, thereby adjusting lever 68 upward or downward with respect to plunger extension 38 and permitting adjustment of the distance between the top of post 74 and the bottom of plunger 24 when the post is in contact with the screw 44. Since the bottom of plunger 24 is maintained in constant contact with workpiece 10 by gauge 23 to continuously measure the diameter of the workpiece during the grinding process, plunger 24 and plunger extension 38 will descend simultaneously with and a distance precisely equal to the decrease caused in the diameter of the workpiece by abrasion by grinding wheel 12. This downward motion is transmitted by screw 44 through post 74 and tongue 72 to lever 68 when the post is in contact with the screw, causing the lever to rotate downwardly about pivot screws 66 and depressing the end of lever 68 opposite from the pivot screws, where are provided novel electrical switch means and novel electrical switch actuating means more particularly hereinafter described.

A snap-action, single-pole, double-throw electrical switch 82 is provided and includes a spring leaf 83 forming a switch arm which bears a common electrical contact 84. Spring leaf 83 is spring-loaded so as to normally rest in a position in which common contact 84 is in positive contact with a lower contact 85, and spaced from an upper contact 86, in which normal position switch 82 is electrically open. Spring leaf 83 is so constructed and spring-loaded that contacts 84 and 86 remain thus separated until the spring leaf is acted upon by sufficient contrary force applied thereto. Upon application to spring leaf 83 of a slight contrary force, the spring leaf will flex slightly but contacts 84 and 85 will remain in mutual contact. When, however, additional contrary force is applied sufficient to flex spring leaf 83 precisely to what is known as its crossover point in that direction, the spring leaf will move with snap-action at a very high speed to its alternate position and causes rapid and positive separation of contacts 84 and 85 and rapid and positive closure between common contact 84 and contact 86, thus permitting electrical current to flow through switch 82. When such contrary force is reduced precisely to the crossover point of spring leaf 83 in the opposite direction, the spring leaf snaps at a very high speed to its normal position, causing rapid and positive separation of contacts 84 and 86 and rapid and positive closure between contact 84 and contact 85, thus interrupting the flow of electrical current thorugh switch 82.

It will be noted, however, that the invention is not limited to the use of a leaf spring to effect such rapid and positive alternate closure and separation of the contacts and to bias the switch to remain normally open, but that other and different means may be employed for the same purpose without departing from the spirit and scope of the invention.

Contacts 85 and 86 are electrically connected to a pair of terminals 88 and 90, respectively, of switch 82. Common contact 84 is electrically connected to a terminal 92 and utilizes spring leaf 83 as a part of such connection. The rapid and positive separation and closure of contact 84 with contacts 85 and 86 effected by the snap-action construction of switch 82 permits the use in direct connection with the switch of electric current sufficient to control directly the grinding machine motor.

Switch 82 is attached by a pair of screws 94 to a switch support bracket 96 which is cast integrally with cover plate 34 and extends from one side of the inner surface thereof into housing 30. Switch 82 is thus rigidly supported in a vertical plane above and with its exposed spring leaf 83 generally parallel to the upper surface of lever 68 when cover plate 34 is attached to housing 30 by a plurality of screws 98.

An upwardly directed contact post 100, having an insulated cap 102 formed of a non-compressible, wear-resistant, electrically non-conductive material such as plastic, covering the upper end thereof, is rigidly attached to the upper surface of lever 68 and projects upward at a right angle therefrom so as to bear directly upward against spring leaf 83 of switch 82 when the upward travel of the lever, urged upward by spring 76 about pivot screws 66, is not limited by contact of post 74 with screw 44. It should be noted that the rigid attachment of post 100 to lever 68 and the direct manner in which cap 102 bears against spring leaf 83 prevent the post and cap from assuming random positions which would vary the aspect in which they lie with respect to the spring leaf when the cap contacts the spring leaf and the point along the spring leaf at which the spring leaf is contacted by the cap. Variations resulting therefrom in the actuation of switch 82 in response to movement of lever 68 are thus prevented. Such variations are critical in the control of grinding operations to very close tolerance.

When gauge 23 is first placed in gauging contact with workpiece 10, plunger 24, plunger extension 38, and screw 44 are lifted to an elevated position by the workpiece. Lever 68 is therefore free to rotate upward about pivot screws 66 under the urging of spring 76 so that cap 102 of post 100 contacts and presses upward against spring leaf 83 of switch 82. At a certain precise elevation of post 74 spring leaf 83 will be flexed to its crossover point by cap 102 and the outer end of the spring leaf will rapidly spring upward, causing rapid and positive closure between contacts 84 and 86, and permitting electrical current to flow between terminals 90 and 92. Contact 84 will remain in positive contact with contact 86 so long as screw 44 does not limit the upward movement of lever 68 by contact with post 74. When plunger 24 and plunger extension 38 move downward in response to reduction in the diameter of workpiece 10 as the grinding operation proceeds, the lower end of screw 44 first contacts and then gradually depresses post 74, causing the lever 68, post 100, and cap 102 to rotate downward about pivot screws 66 and thereby relieve the upward pressure of cap 102 against spring leaf 83 created by spring 76. When the upward pressure has been reduced to the precise amount sufficient to permit spring leaf 83 to be flexed by its spring loaded construction to its crossover point in the direction of contact 85, the outer end of spring leaf 83 will rapidly spring downward, causing rapid and positive separation of common contact 84 from contact 86, thereby interrupting the flow of electrical current between terminals 90 and 92.

Electrical connection is made by wires 99, 99 joining a conventional power source generally indicated at 101, terminals 90 and 92 of switch 82, and the conventional control circuits 103 of the grinding machine, to cause electrical current to flow between terminals 90 and 92, and the grinding machine to grind, when contact 84 is in contact with contact 86, and to cause the grinding machine to cease grinding when the flow of current between terminals 90 and 92 is interrupted by separation of contact 84 from contact 86. A cable clamp 104, attached to cover plate 34 by a pair of screws 106, retains a ferrule 108 surrounding an aperture 110 in the base plate to receive the electrical wires.

Rotation of thimble 59 is transmitted through flange 56 to fork bar 52, fork pins 50, and screw 44, thus permitting screw 44 to be adjusted longitudinally within plunger extension 38 and slot 40. The distance between the top of post 74 and the bottom of plunger 24 when the post is in contact with the screw may thus be selectively and delicately adjusted. Since the point of contact of screw 44 with post 74 is closer to the pivot axis of lever 68 than is the point of contact of cap 102 of post 100 with spring leaf 83, downward movement of the post is multiplied by the principles of leverage when transmitted to post 100, cap 102, and spring leaf 83 by the lever. Rigid connection of post 100 and cap 102 to lever 68 causes cap 102 to contact the same point on spring leaf 84 each time contact is made and eliminates the possibility of assumption by post 100 and cap 102 of random positions, of any resultant variation in their total effective length, and of variation thereby caused in the actuation of switch 82.

I also provide in this embodiment of my invention a second snap-action, single-pole, double-throw electrical switch 112 identical to switch 82 and mounted in a novel, adjustable manner, generally parallel to and, with respect to lever 68, slightly above switch 82, for the purpose of slowing the rate of grinding feed as the workpiece approaches final diameter and prior to the separation of contacts 84 and 86 of switch 82. Switch 112 is attached to an L-shaped floating support bracket 113 by a pair of screws 114. Bracket 113 is, however, not cast integral with cover plate 34 but is instead floatingly connected thereto by a pair of spaced, parallel support bracket leaf springs 115 in stacked arrangement, engaged respectively within a pair of slots 116 in bracket 113 and a pair of slots 117 in cover plate 34, as best shown in FIGURE 7.

When thus mounted, switch 112 is supported in spaced relationship to switch 82, its normal position being slightly more distant above lever 68 than is that of rigidly mounted switch 82, and capable of being moved, against the resistance of leaf springs 115, within a plane parallel to that of switch 82, by a downwardly-directed differential adjusting screw 118 threadably engaged within a threaded aperture 119 in the top of housing 30 to bear downward against the top of floating support bracket 113. When switch 104 is thus mounted, the exposed spring leaf 120 of switch 112 is slightly above and generally parallel to the upper surface of transfer lever 68 and slightly more distant therefrom than is spring leaf 83 of rigidly mounted switch 82.

A second contact post 121, having an insulated cap 122 thereon, is rigidly attached to the upper surface of lever 68, in spaced, parallel arrangement to post 100 and cap 102, respectively, so as to bear directly upward against spring leaf 120 of switch 112 when the upward travel of the lever is not limited by contact of post 74 with screw 44. Spring leaf 120 is thus caused to snap from its downward position to its upward position, and to maintain its common contact (not shown) in contact with its upper contact (not shown) by the upward pressure of post 121 and cap 122 until such upward pressure is relieved to the crossover point of spring leaf 113 by downward movement of lever 68, post 121, and cap 122, imparted by downward movement of screw 44 to post 74. Electrical connection is made between appropriate terminals 123, 124 and 126 of switch 112 and the appropriate conventional control circuits of the grinding feed mechanism to cause the rate of grinding feed to proceed at a normal rate when the common contact of switch 112 is in contact with the upper contact of said switch, and to cause the grinding feed to proceed at a slower rate when the common contact of switch 112 is separated from the upper contact of said switch.

Spring 76 is selected to have a strength just sufficient to elevate transfer lever 68 against spring leaves 83 and 120 to cause the spring leaves to snap from their respective downward positions to their respective upward positions, within switches 82 and 112, respectively, when screw 44 does not limit the upward movement of lever 68 by contact with post 74. Since plunger 24, plunger extension 38, and screw 44 are free to travel upward within gauge frame 37, housing 30, and turret 32 without disturbing post 44 or lever 68, spring leaves 83 and 120 will remain in their upward positions, and switches 82 and 112 thus will remain closed, causing the grinding wheel to rotate and the rate of grinding feed to proceed normally when a substantially oversized workpiece is embraced by the calipers of gauge 23. The strength of spring 76 being just sufficient to support lever 68, its posts and insulating caps against the spring leaves 83 and 120 so as to press the spring leaves upwardly, past their respective crossover points, and to maintain them in that position when upward movement of the lever is not limited by screw 44, spring leaves 83 and 120 will be permitted to move downwardly to their respective crossover points at which switches 82 and 112, respectively, will be opened, in delicate response to downward movement of post 74 when the post is depressed by screw 44.

To adjust the gauge-operated machine control switch, differential adjusting screw 118 is first rotated to adjustably depress floating support bracket 113 and switch 112 to provide any interval desired between the diameter of the workpiece at which the rate of grinding is to be reduced by relief of upward pressure against spring leaf 120 of switch 112 to the crossover point of spring leaf 120 and the final diameter of the workpiece at which grinding will be halted by relief of upward pressure against spring leaf 83 of switch 82 to the crossover point of spring leaf 83. Graduated thimble 59 is then rotated, causing screw 44 to ascend or descend, as desired by the operator, within plunger extension 38, thereby lowering or raising post 74, tongue 72, lever 68, contact posts 100 and 121 and their respective insulating caps, 102 and 122, with respect to the spring leaves 83 and 120 of switches 82 and 112, respectively, and adjusting the control switch to cause relief of upward pressure by cap 102 against spring leaf 83 of snap-action switch 82 to the crossover point of said spring leaf when the workpiece has been reduced precisely to the desired final diameter. Allowance may be made for any remaining lag resulting from momentum of grinding wheel 12 by adjusting thimble 59 to cause spring leaf 83 to snap to its lower position at a slightly increased diameter of the workpiece. Such lag, and the commensurate correction, will be constant for a series of workpieces each being ground to an identical diameter by the same grinding machine. The workpiece is then mounted in the workpiece support with the calipers of the continuous grinding gauge embracing the workpiece in measuring relation thereto.

As the diameter of the workpiece is reduced by abrasion by grinding wheel 12, plunger 24, plunger extension 38, and screw 44 move downward. Screw 44 contacts post 74 and slowly depresses lever 68 about pivot screws 66 against spring 76. When workpiece 10 begins to approach the desired final diameter, the upward pressure of cap 122 against spring leaf 120 of switch 112 will be gradually relieved until the spring leaf is permitted to snap rapidly from its upward position to its downward position, causing a rapid, positive separation of the common contact of switch 112 from the upper contact of said switch, whereby grinding feed is caused to proceed at a reduced rate.

It will be noted that, since rigidly mounted switch 82 and its spring leaf 83 are mounted slightly closer to transfer lever 68 than are floating switch 112 and its spring leaf 120, upward pressure of cap 102 against spring leaf 83 will not yet have been relieved to the crossover point of spring leaf 83, so that the spring leaf remains in its upward position within switch 82, causing switch 82 to remain closed and the grinding machine to continue operation despite the opening of switch 112 and the consequent reduction in the rate of grinding feed. The reduction in the rate of grinding feed, however, causes further reduction in the diameter of the workpiece to proceed at a much slower rate as the workpiece thereafter approaches final diameter. It should also be noted that, by forming post 121 and cap 122 of shorter length, switch 112 may be mounted at the same distance from lever 68 as switch 82, or even closer to lever 68 than switch 82, to cause actuation of switch 112 prior to actuation of switch 82, without departing from the principle of the invention.

As the diameter of the workpiece thereafter continues slowly to decrease, lever 68 continues to be slowly depressed in the same manner as hereinbefore described, thereby continuing to gradually relieve the upward pressure of cap 102 against spring leaf 83 of switch 82. When workpiece 10 reaches final diameter, post 74 will be at a certain precise elevation such that the upward pressure of cap 102 against spring leaf 83 will have been precisely reduced to the downward crossover point of spring leaf 83, permitting the spring leaf to snap rapidly from its upward position to its downward position, whereby common contact 84 is rapidly removed from positive contact with upper contact 86 and rapidly placed in positive contact with lower contact 85. The flow of electrical current to the conventional grinding machine control is thus rapidly broken by the rapid separation of contacts 84 and 86 and grinding is halted.

Switches 82 and 112 may be connected directly in the electrical power lines transmitting current to the control circuits of the grinding machine and grinding feed mechanism, thereby eliminating the necessity of separate, intermediate power boxes or relays. The switches are capable of carrying normal power loads without sacrificing an accurate, repeatable crossover point. Time lags and variations in response inherent in the use of such intermediate devices due to heat, friction, lack of maintenance, the deterioration of the electrical characteristics of vacuum tubes and other electrical components, are thus prevented.

Cover plate 34 may be easily removed for maintenance of the control switch and for replacement of switches 82 and 112. The control switch is less expensive to construct, more dependable in performance, easier to maintain, contained in a single, self-contained package mounted directly upon the continuous grinding gauge, and of such light weight that it will not unduly influence the action and sensitivity of the gauge.

In one modification of the invention, best illustrated in FIGURE 8, means is provided whereby the invention may be utilized to control the grinding of a workpiece to an elliptical cross section having its major axis within extremely small tolerance of a preselected size.

Since upward pressure on spring leaf 83 by cap 102 is relieved in response to downward movement of plunger 24 as the diameter of a workpiece is reduced by grinding, the invention will automatically control the grinding operation to achieve a preselected final size for the shortest cross-sectional axis of the workpiece. When the workpiece has an elliptical cross section, plunger 24 will be elevated as the workpiece is axially rotated from the position in which it presents its minor cross-sectional axis to the plunger to the position in which it presents its major cross-sectional axis to the plunger. Since elevation of plunger 68 will not relieve the upward pressure of cap 102 on spring leaf 83, the invention, without the modification hereinafter described, will control the grinding machine with respect to the minor cross-sectional axis of a workpiece of elliptical cross section.

When control is desired of the size of the greatest or major cross-sectional axis of an elliptical workpiece, such as a piston 128, a conventional time delay relay 130 is utilized to maintain the flow of electrical current to the grinding machine without interruption during intervals of time prior to reduction of the major cross-sectional axis of the workpiece to preselected final size, when contact is broken between common contact 84 and upper contact 86 of snap-action switch 82 by relief of upward pressure by cap 102 against spring leaf 83.

Time delay relay 130 is of conventional construction and may consist of a solenoid 132 connected in series with switch 82, disposed when energized to close another snap-action electrical switch 134 through which electrical current is permitted to flow from a conventional source to the conventional control panel of the grinding machine to continue the grinding machine in operation until switch 134 is opened by delayed reflex action of an adjustable vented pneumatic chamber 136 instantaneously expanded by the solenoid when the solenoid is energized.

Each time the elliptical workpiece is rotated from a position in which its minor cross-sectional axis is presented to plunger 24 to a position in which its major cross-sectional axis is presented to the plunger, the plunger will be elevated and thereby permit cap 102 to depress spring leaf 83 of switch 82 upwardly, causing closure of common contact 84 and upper contact 86 of the switch during the short interval of time the major cross-sectional axis of the workpiece is in this position. Closure of contacts 84 and 86 causes a pulse of electrical current to flow between terminals 90 and 92, thereby energizing solenoid 132. Each time solenoid 132 is thus energized, it will expand pneumatic chamber 136 against a compression spring 137, causing air to enter therein through a check valve 138, and simultaneously closing switch 134. Switch 134 is arranged to remain closed, permitting electrical current to flow from a conventional source to the grinding machine to continue said machine in operation, until opened by reflex action of pneumatic chamber 136 as air is permitted to bleed out of the chamber through adjustable vent 140 under pressure of spring 137. Adjustment of the size of vent 140 permits adjustment of the length of time required for air to leave pneumatic chamber 136 and the chamber to contract, hence permitting adjustment of the length of time switch 134 will remain closed and electrical current permitted to flow therethrough to the grinding machine motor control.

Time delay relay 130, during the period switch 134 remains closed, permits electrical current to continue to flow to the grinding machine motor control without interruption despite separation of common contact 84 and upper contact 86 of switch 82 when the elliptical workpiece presents to plunger 24 cross-sectional axes of smaller size than that preselected for the major axis. So long as the major cross-sectional axis of the workpiece remains oversize, plunger 24 will be elevated by each end of that axis a distance sufficient to permit closure between contacts 84 and 86 of switch 82, thus re-energizing time delay relay 130. By adjusting vent 140 of pneumatic chamber 136 to cause the switch 134 to remain closed, following energization of solenoid 132, for an interval of time slightly in excess of that required for the workpiece to rotate 180 degrees, switch 134 is caused to remain closed and the grinding machine to continue operation without interruption so long as the major cross-sectional axis of the workpiece remains oversize, despite separation of contacts 84 and 86 of switch 82 when smaller axes of the workpiece are presented to plunger 24.

When the major cross-sectional axis of the workpiece reaches its preselected final size, neither end thereof, when presented, will elevate plunger 24 a distance sufficient to cause closure of contacts 84 and 86 of switch 82 and re-energization of solenoid 132. Switch 134 will then be caused to open by full contraction of pneumatic chamber 136, thus breaking the electrical circuit to the grinding machine motor control and causing the grinding operation to be halted. Since the major axis of the workpiece will have rotated 180 degrees since the time solenoid 132 was last energized, and since pneumatic chamber 136 is adjusted to open switch 134 when the workpiece has rotated more than 180 degrees, switch 134 will open during the period that the workpiece rotates the next 180 degrees after the major axis has reached preselected size. By adjustment of vent 140 this period can be reduced to any desired length.

Where it is desired to slow the rate of grinding feed as the major axis of an elliptical workpiece approaches preselected final size, floating snap-action switch 112 may be included in this modified form of the invention for such purpose, in combination with a second, similar time delay relay electrically connected to the grinding feed mechanism to permit grinding feed to proceed without reduction in rate until the major axis has been reduced to the preselected size at which a slower rate of grinding feed is desired.

While the invention has been shown and described as having a pair of snap-action, single-pole, double-throw electrical switches, adjustable for various differentials, to first slow the rate of grinding feed and then to halt the grinding operation entirely, it is to be understood that the floating switch or a third switch added to the device may be utilized to control other and different operations than adjusting the rate of grinding feed or of rotation of the grinding wheel.

While the form of apparatus and the method of operation herein described constitute preferred embodiments of the invention, it is to be understood that the invention is not limited thereto and that changes may be made therein without departing from the scope of the invention which is defined in the appended claims.

What is claimed is:

1. In a grinding machine having an electrical circuit and a grinding gauge including a movable element in continuous contact with a workpiece, an electrical control for controlling operation of said machine including an electrical switch, said switch being arranged to permit electrical current to flow in said circuit when a cross-section axis of said workpiece of greater than a preselected size is in contact with said plunger and to interrupt said flow of current when a cross-sectional axis of said workpiece of less than said preselected size is in contact with said plunger, and a time delay relay arranged to be energized by said flow of current and when thus energized to permit a flow of current in said circuit external to said switch while cross-sectional axes of said workpiece of less than said preselected size are in contact with said plunger, until the greatest cross-sectional axis of said workpiece has been reduced to said preselected size.

2. In combination with a grinding machine, an electrical circuit, and a grinding gauge, including a movable element in continuous contact with a workpiece, an electrical control for controlling flow of current in said circuit and for controlling operation of said machine, said control comprising, a snap-action electrical switch, said switch including a fixed contact and a movable switch arm carrying a second contact, first means associated with said switch arm for effecting rapid and positive separation and closure of said contacts when said switch arm is moved to predetermined positions, said means being biased to yieldingly urge said switch arm to a position in which said means associated with said switch arm effects separation of said contacts, second means directly contactable with said switch arm, third means arranged to cause said second means to contact and yieldingly move said switch arm in opposition to said bias to a position in which said first means causes closure of said contacts when said workpiece is of greater than a preselected size, and means adapted to move said second means in opposition to said third means in response to movement of said movable element as said workpiece is reduced in size, to effect rapid and positive separation of said contacts when said workpiece is reduced to said preselected size.

3. In a control switch adapted for combination with a grinding machine, an electrical circuit, and a grinding gauge having a movable element adapted to continuously contact a workpiece, the combination comprising a snap-action electrical switch connected in said circuit, said switch being arranged to cause rapid and positive closure of a pair of electrical contacts when a movable switch element is moved to a known position in said one direction and to cause rapid and positive separation of said contacts when said switch element is moved to a known position in said opposite direction, said switch element being yieldingly biased to move to said known position in said opposite direction, and a pivoted lever arranged to be rotated in said one direction by second yieldingly urging means to directly contact said switch element and to move said element in said one direction in opposition to said bias when said lever is not restrained, and being further arranged to be rotated in said opposite direction in response to movement of said movable element as said workpiece is reduced in size, to effect closure of said contacts when said workpiece is oversize and to effect rapid and positive separation of said contacts when said workpiece is reduced to a preselected size.

4. In combination with a grinding machine, an electrical circuit, and a grinding gauge, including a movable element in continuous contact with a workpiece, an electrical control for controlling flow of current in said circuit and for controlling operation of said machine, said control comprising a snap-action electrical switch, said switch including a fixed contact and a movable switch arm carrying a second contact, spring means associated with said switch arm for effecting rapid and positive separation and closure of said contacts when said switch arm is moved to predetermined positions, said spring means being biased to yieldingly urge said switch arm to a position in which said spring means effects separation of said contacts, a pivoted lever adapted to directly contact said switch arm and to move said arm to a position in which said spring means causes closure of said contacts, second spring means arranged to cause said lever to directly contact and yieldingly move said arm in opposition to said bias to a position in which said first spring means causes closure of said contacts when said workpiece is of greater than a preselected size, and means associated with said movable element and adapted to move said lever in opposition to said second spring means in response to movement of said movable element as said workpiece is reduced in size, to effect rapid and positive separation of said contacts when said workpiece is reduced to said preselected size.

5. In combination with a grinding machine, an electrical circuit, and a grinding gauge, including a movable element in continuous contact with a workpiece, an electrical control for controlling flow of current in said circuit and for controlling operation of said machine, said control comprising a snap-action electrical switch, said switch including a fixed contact and a movable switch arm carrying a second contact, spring means associated with said switch arm for effecting rapid and positive separation and closure of said contacts when said switch arm is moved to predetermined positions, said spring means being biased to yieldingly urge said switch arm to a position in which said spring means effects closure of said contacts, a pivoted lever adapted to directly contact said switch arm and to move said arm to a position in which said spring means causes separation of said contacts, second spring means arranged to cause said lever to directly contact and yieldingly move said arm to opposition to said bias to a position in which said first spring means causes separation of said contacts when said workpiece is of greater than a preselected size, and means associated with said movable element and adapted to move said lever in opposition to said second spring means in response to movement of said movable element as said workpiece is reduced in size, to effect rapid and positive closure of said contacts when said workpiece is reduced to said preselected size.

6. In combination with a controllable grinding machine, a workpiece support, a grinding gauge including a movable plunger in continuous contact with a workpiece, and an electrical control circuit, a gauge-operated grinding machine control switch comprising: a housing connected to the top of the frame of said grinding gauge; a transfer lever pivotally supported at one end thereof within said housing and having an aperture therein and a first post rigidly mounted thereon and movable therewith; a slotted plunger extension connected to said plunger and extending through apertures in the top of said frame and said housing and said aperture in said transfer lever; a snap-action electrical switch in said electrical circuit, said switch including a fixed contact and a movable switch arm carrying a second contact, means associated with said switch arm for effecting rapid and positive separation of said contacts when said switch arm is moved past a crossover point in one direction and for effecting rapid and positive closure of said contacts when said switch arm moves past a crossover point in the oppoiste direction; spring means yieldingly urging said switch arm to move past said crossover point in said opposite direction; said switch arm being disposed to be directly and releasably contactable by said first post on said transfer lever; second spring means urging said transfer lever to rotate about its pivotal support to cause said first post to directly contact said switch arm; a tongue connected to said transfer lever and extending into said aperture in said transfer lever and into said slot in said plunger extension and having a second post thereon disposed within said slot, and adjustable means connected to said plunger extension and engageable with said second post to rotate said transfer lever and said first post in opposition to said second spring means to permit said switch arm to move past said crossover point in said opposite direction when the workpiece is reduced to a preselected size.

7. The device of claim 6 having a pair of said snap-action electrical switches connected in a pair of electrical circuits, and a pair of said first posts rigidly mounted on and movable with said transfer lever, each of said first posts being adapted to actuate the switch arm of one of said switches, one of said electrical switches being rigidly mounted with respect to said housing and the other said electrical switch being mounted adjustably with respect to said first electrical switch and with respect to said transfer lever.

8. The device of claim 6 wherein said other electrical switch is supported by flexible means attached to said housing and permitting movement thereof, and means for adjusting the position of said other switch with respect to said first electrical switch and with respect to the post by which the switch arm of said other switch is contactable.

9. The device of claim 6 wherein said flexible means includes a spring leaf and wherein said means for adjusting the position of said other switch comprises a screw threadably engaged with said housing and directed to contact and move said switch.

10. In combination with a grinding machine, a workpiece support, and a grinding element relatively movable to effect a grinding feed, a grinding gauge including a movable plunger in continuous contact with a workpiece, feeding mechanism, control mechanism for said grinding machine and for said feeding mechanism including electric circuits, a gauge-operated machine control switch comprising; a housing connected to the top of the frame of said grinding gauge; a first snap-action electrical switch in said electric circuit with said control mechanism for said grinding machine and supported by a first bracket attached to a base plate connected to said housing; a second snap-action electrical switch in said electric circuit with said control mechanism for said feeding mechanism and supported by a second bracket flexibly supported by first spring means connected to said base plate; adjusting means arranged to contact and move said second switch with respect to said first switch; each said switch including, respectively, a fixed contact and a spring leaf carrying a second contact, said spring leaf being arranged to effect rapid and positive separation of said contacts when said spring leaf moves past a crossover point in one direction and for effecting rapid and positive closure of said contacts when said switch arm moves past a crossover point in the opposite direction; second spring means associated with each said spring leaf, respectively, yieldingly urging said spring leaf to move past its said crossover point in said opposite direction; a transfer lever pivotally supported at one end thereof within said housing and having an aperture therein and first and second posts rigidly mounted thereon and movable therewith; each said spring leaf being disposed to be directly and releasably contactable by one of said posts, respectively; a compression spring in contact with said transfer lever urging said transfer lever to rotate about its pivotal support to cause said posts to directly contact said spring leaves, respectively; a slotted plunger extension connected to said plunger and extending through apertures in the top of said frame and said housing and said aperture in said transfer lever; a tongue connected to said transfer lever and extending into said aperture in said transfer lever and into said slot in said plunger extension and having a third post thereon disposed within said slot and contactable by a screw adjustably retained within said plunger extension; and a graduated thimble rotatably mounted upon said housing and connected to a fork bar the prongs of which engage a pair of slots in the head of said adjusting screw to rotate same and to adjust said adjusting screw longitudinally within said slot in said plunger extension; to rotate said transfer lever and said first and second posts in opposition to said compression spring to permit said spring leaves to move past their respective crossover points in said opposite direction, to allow electric current to flow in each said circuit, respectively, while said workpiece is of greater size than that respectively preselected therefor and to interrupt said flow of current in each said switch when said workpiece has been reduced to said size respectively preselected.

References Cited in the file of this patent
UNITED STATES PATENTS

| | | |
|---|---|---|
| 2,267,559 | Foster | Dec. 23, 1941 |
| 2,666,993 | Foster | Jan. 26, 1954 |